United States Patent
Iizuka

(10) Patent No.: US 10,250,378 B2
(45) Date of Patent: Apr. 2, 2019

(54) BASE STATION APPARATUS AND METHOD FOR CONTROLLING BASE STATION APPARATUS

(71) Applicant: NEC Corporation, Tokyo (JP)

(72) Inventor: Hiroto Iizuka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/536,992

(22) PCT Filed: Sep. 10, 2015

(86) PCT No.: PCT/JP2015/004613
§ 371 (c)(1),
(2) Date: Jun. 16, 2017

(87) PCT Pub. No.: WO2016/098272
PCT Pub. Date: Jun. 23, 2016

(65) Prior Publication Data
US 2017/0331618 A1 Nov. 16, 2017

(30) Foreign Application Priority Data
Dec. 19, 2014 (JP) ................................ 2014-257495

(51) Int. Cl.
*H04L 7/033* (2006.01)
*H04L 27/18* (2006.01)
(Continued)

(52) U.S. Cl.
CPC ............ *H04L 7/033* (2013.01); *H04L 7/0083* (2013.01); *H04L 27/18* (2013.01); *H04W 56/00* (2013.01);
(Continued)

(58) Field of Classification Search
USPC .................................................. 375/376, 291
See application file for complete search history.

(56) References Cited

U.S. PATENT DOCUMENTS 5,363,438 A * 11/1994 Tanaka .................. H04L 7/0331
375/362
7,298,576 B2 * 11/2007 Asakura ................. B82Y 10/00
360/77.08
(Continued)

FOREIGN PATENT DOCUMENTS

JP 11-74893 A 3/1999
JP 2008-516503 A 5/2008
(Continued)

OTHER PUBLICATIONS

QUALCOMM Incorporated, "Considerations for Energy Savings in UMTS NodeBs," 3GPP TSG RAN WG1 Meeting #59bis, R1-100287, Jan. 18-22, 2010, 10 pages.
(Continued)

Primary Examiner — Eva Y Puente
(74) Attorney, Agent, or Firm — Sughrue Mion, PLLC

(57) ABSTRACT

According to one embodiment, a base station apparatus includes: a radio equipment control that generates a baseband signal including data; a microwave apparatus that modulates the baseband signal to a microwave to transmit by radio; a microwave apparatus that demodulates the received first microwave to the baseband signal, then extracts a clock from a cycle of the data included in the baseband signal, imports the baseband signal in synchronization with the clock, and plays back the data; and a radio equipment that modulates the data played back by the microwave apparatus to a high-frequency signal, and the microwave apparatus outputs dummy data instead of the played back data when a frequency fluctuation amount of the clock exceeds a predetermined range.

13 Claims, 5 Drawing Sheets

(51) Int. Cl.
 *H04W 56/00* (2009.01)
 *H04L 7/00* (2006.01)
(52) U.S. Cl.
 CPC ... *H04W 56/0015* (2013.01); *H04W 56/0035* (2013.01)

(56) References Cited

U.S. PATENT DOCUMENTS

| | | | | |
|---|---|---|---|---|
| 8,406,366 B2* | 3/2013 | Hattori | ...................... | H03L 7/22 375/354 |
| 2007/0210849 A1* | 9/2007 | Kuwajima | ................ | G06F 1/04 327/291 |
| 2008/0159106 A1* | 7/2008 | Immink | ........... | G11B 20/10009 369/59.17 |
| 2008/0317185 A1* | 12/2008 | Mueller | ................ | H03D 3/006 375/376 |
| 2010/0074121 A1* | 3/2010 | Sakama | ................ | H04W 24/00 370/248 |
| 2012/0176485 A1* | 7/2012 | Miyauchi | ........... | G02B 27/2264 348/56 |
| 2014/0192796 A1 | 7/2014 | Zhang | | |
| 2015/0146613 A1* | 5/2015 | Shor | ..................... | H04W 24/02 370/328 |
| 2016/0380757 A1* | 12/2016 | Aiso | ....................... | G06F 3/162 375/376 |

FOREIGN PATENT DOCUMENTS

| | | |
|---|---|---|
| JP | 2010-074594 A | 4/2010 |
| JP | 2013-012818 A | 1/2013 |

OTHER PUBLICATIONS

International Search Report of PCT/JP2015/004613 dated Nov. 2, 2015.

* cited by examiner

BASE STATION APPARATUS AND METHOD FOR CONTROLLING BASE STATION APPARATUS

CROSS REFERENCE TO RELATED APPLICATIONS

This application is a National Stage of International Application No. PCT/JP2015/004613 filed Sep. 10, 2015, claiming priority based on Japanese Patent Application No. 2014-257495 filed Dec. 19, 2014, the contents of all of which are incorporated herein by reference in their entirety.

TECHNICAL FIELD

The present invention relates to a base station apparatus and a method for controlling the base station apparatus, and relates to, for example, a base station apparatus and a method for controlling the base station apparatus which is suitable for reducing cost.

BACKGROUND ART

Interface standards between a radio equipment control (REC) and a radio equipment (RE) which compose a base station apparatus include CPRI (Common Public Radio Interface) standards (registered trademark).

Patent Literature 1 discloses a technique related to an interface between a radio equipment control and a radio equipment. Patent Literature 1 discloses a base station apparatus which connects the radio equipment control and the radio equipment via a cable (transmission link).

In addition, Patent Literature 2 discloses a data communication apparatus which switches a dummy clock from a regular synchronization clock when it is determined that serial data communication is not executed between first communication means and second communication means.

CITATION LIST

Patent Literature

PTL 1: Published Japanese Translation of PCT International Publication for Patent Application, No. 2008-516503
PTL 2: Japanese Unexamined Patent Application Publication No. H11-074893

SUMMARY OF INVENTION

Technical Problem

The base station apparatus disclosed in Patent Literature 1 delivers data between the radio equipment control and the radio equipment via a cable. Hence, when the base station apparatus is installed, it is necessary to install cables such as optical cables at an installation place of the base station apparatus, and there is a problem that cost increases as a result. Other problems of the prior art and new features of the present invention will become more apparent from the description and the drawings accompanying this description.

The present invention has been made to solve the above problem, and an object of the present invention is to provide a base station apparatus and a method for controlling the base station apparatus which can reduce cost necessary to install cables such as optical cables by delivering data between a radio equipment control and a radio equipment by radio.

Solution to Problem

According to one embodiment, a base station apparatus includes: a radio equipment control that generates a first baseband signal including first data; a first microwave apparatus that modulates the first baseband signal to a first microwave to transmit by radio; a second microwave apparatus that demodulates the received first microwave to the first baseband signal, then extracts a first clock from a cycle of the first data included in the first baseband signal, imports the first baseband signal in synchronization with the first clock, and plays back the first data; and a radio equipment that modulates the first data played back by the second microwave apparatus to a first high-frequency signal, and the second microwave apparatus outputs first dummy data instead of the played back first data when a frequency fluctuation amount of the first clock exceeds a predetermined range.

Further, according to one embodiment, a method for controlling a base station apparatus includes: generating a first baseband signal including first data; modulating the first baseband signal to a first microwave to transmit by radio from a first microwave apparatus; demodulating the first microwave received by a second microwave apparatus to the first baseband signal, and then extracting a first clock from a cycle of the first data included in the first baseband signal; importing the first baseband signal in synchronization with the first clock and playing back the first data when a frequency fluctuation amount of the first clock is in a predetermined range; modulating the played back first data to a first high-frequency signal; and generating first dummy data instead of the first data when the frequency fluctuation amount of the first clock exceeds the predetermined range.

Advantageous Effects of Invention

According to the embodiment, it is possible to provide a radio equipment control and a radio equipment which can reduce cost necessary to install cables such as optical cables by delivering data between the radio equipment control and the radio equipment by radio.

DESCRIPTION OF EMBODIMENTS

Figure 1:
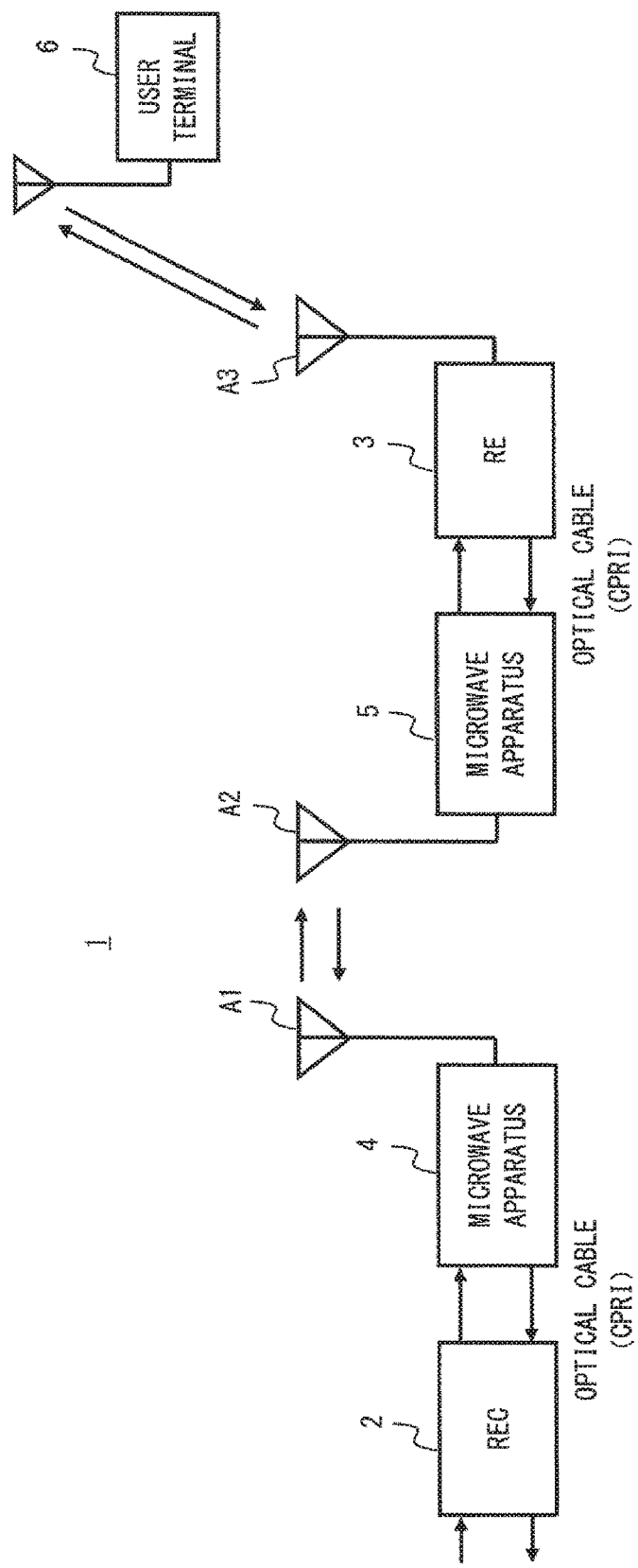
FIG. 1 is a block diagram illustrating a wireless communication system which includes a base station apparatus according to a first embodiment.

Embodiments will be described below with reference to the drawings. In this regard, the drawings are simplified, and therefore the technical scope of the embodiments should not be narrowly interpreted on the ground of illustrations of these drawings. Further, the same components will be assigned the same reference numerals and overlapping explanation will be omitted.

The embodiments will be divided into a plurality of sections or a plurality of embodiments for ease of explanation when necessary. However, unless explicitly described in particular, a plurality of sections or a plurality of embodiments are not irrelevant to each other, and one of a plurality of sections or a plurality of embodiments and one of a plurality of sections or a plurality of embodiments relates to modified examples, application examples, detailed description and supplementary description of part or all of the other one of a plurality of sections or a plurality of embodiments. Further, in the following embodiments, the numbers (including numbers, numerical values, amounts and ranges) of elements mentioned herein are not limited to specific numbers unless explicitly described in particular and except for a case where the numbers are fundamentally obviously limited to the specific numbers, and may be the specific numbers or more or less.

Further, in the following embodiments, components (including operation steps, too) are not necessarily indispensable unless explicitly described in particular or except for a case where the components are fundamentally obviously indispensable. Similarly, in the following embodiments, shapes and positional relationships of the components mentioned herein include shapes substantially approximate to or similar to the shapes unless explicitly described in particular or except for a case where shapes and positional relationships are not fundamentally obviously true. This applies to the above numbers (including the numbers, the numerical values, the amounts and ranges), too.

First Embodiment

FIG. 1 is a block diagram illustrating a wireless communication system which includes a base station apparatus 1 according to the first embodiment. The base station apparatus 1 according to the present embodiment delivers data between a radio equipment control and a radio equipment by radio. By this means, it is possible to reduce the number of cables such as optical cables installed at an installation place of the base station apparatus 1, so that it is possible to reduce cost necessary to install the cables. This will be specifically described below.

As illustrated in FIG. 1, the wireless communication system is a system which performs wireless communication between the base station apparatus 1 and a user terminal 6. The user terminal 6 is, for example, a mobile terminal such as a mobile telephone and a notebook PC.

The base station apparatus 1 includes a radio equipment control (REC) 2, a radio equipment (RE) 3, and a microwave apparatus (first microwave apparatus) 4 and a microwave apparatus (second microwave apparatus) 5 which deliver data between the radio equipment control 2 and the radio equipment 3 by radio.

A transmission path of the base station apparatus 1 will be described below.

The radio equipment control 2 generates a baseband signal (first baseband signal) including data, a clock and a control signal received from a higher level apparatus which is not illustrated. In this regard, a serial data interface between the radio equipment control 2 and the radio equipment 3 employs CPRI standards. Hence, synchronization accuracy between the radio equipment control 2 and the radio equipment 3 needs to be within a range of ±0.002 ppm.

The microwave apparatus 4 modulates a baseband signal supplied from the radio equipment control 2 via an optical cable, generates a microwave (first microwave) and transmits the microwave by radio via an antenna A1.

The microwave apparatus 5 receives via an antenna A2 the microwave transmitted by radio from the microwave apparatus 4 via the antenna A1. Further, the microwave apparatus 5 demodulates the received microwave to a baseband signal, extracts a clock (first clock) from a cycle of data (first data) included in this baseband signal, imports this baseband signal in synchronization with this clock, and plays back the data (first data).

The radio equipment 3 modulates playback data supplied from the microwave apparatus 5 via an optical cable to a high-frequency signal (first high-frequency signal). The radio equipment 3 transmits this high-frequency signal by radio to outside via an antenna A3, and the user terminal 6 receives the high-frequency signal.

Thus, the base station apparatus 1 delivers data between the radio equipment control 2 and the radio equipment 3 by radio. In other words, the base station apparatus 1 includes a radio transmission interval in a serial data interface channel provided between the radio equipment control 2 and the radio equipment 3. Consequently, it is possible to reduce the number of cables such as optical cables installed at an installation place of the base station apparatus 1 and consequently reduce cost necessary to install the cables.

In this regard, as described above, very high synchronization accuracy is demanded between the radio equipment control 2 and the radio equipment 3. However, there is a concern that as the base station apparatus 1 delivers data between the radio equipment control 2 and the radio equipment 3 by radio, synchronization accuracy will be lowered due to an influence of phase noise unless a countermeasure is taken. Hence, the base station apparatus 1 improves the synchronization accuracy by narrowing a loop bandwidth of a PLL (Phase Locked Loop) circuit (not shown in FIG. 1) which is provided to the microwave apparatus 5 at a reception side thereof, and generates a synchronization clock of a clock extracted from a baseband signal. However, narrowing the loop bandwidth of the PLL circuit is likely to unlock the PLL circuit when a frequency fluctuation amount of the clock becomes large. As a result, an unintentional frequency fluctuation caused by switching a clock and an abrupt frequency fluctuation due to a radio abnormality are likely to make it impossible to satisfy radio standards (CPRI standards) between the radio equipment 3 and the user terminal 6 or maintain a link between the radio equipment control 2 and the user terminal 6.

Hence, the microwave apparatus 5 has a function of controlling and determining whether or not it is possible to execute synchronization processing on data accompanying playback of a clock according to a signal quality of the radio transmission interval. More specifically, the microwave apparatus 5 outputs dummy data (first dummy data) instead of played back data until the frequency fluctuation amount of the clock stabilizes within a predetermined range when the frequency fluctuation amount of the clock exceeds the predetermined range. In this regard, the dummy data is data which satisfies synchronization accuracy to satisfy radio standards which are demanded between the radio equipment 3 and the user terminal 6. Hence, even when the frequency fluctuation amount of the clock becomes large, the base station apparatus 1 can satisfy the radio standards (CPRI standards) between the radio equipment 3 and the user terminal 6 and maintain the link between the radio equipment control 2 and the user terminal 6. Consequently, it is possible to quickly resume communication when, for example, the frequency fluctuation amount of the clock becomes small.

A case where the interface between the radio equipment control 2 and the radio equipment 3 employs the CPRI standards has been described in the present embodiment. However, the interface is not limited to this and may employ other radio standards which demand high synchronization accuracy.

Further, only the transmission path of the base station apparatus 1 has been described in the present embodiment. However, the present invention is also applicable to a reception path of the base station apparatus 1. This will be briefly described below.

In this case, for example, the radio equipment 3 receives a high-frequency signal (second high-frequency signal) transmitted by radio from the user terminal 6 via the antenna A3, and demodulates the received high-frequency signal to a baseband signal (second baseband signal). The microwave apparatus 5 modulates the baseband signal demodulated by the radio equipment 3 to a microwave (second microwave), and transmits the microwave by radio via the antenna A2. The microwave apparatus 4 receives via the antenna A1 the microwave transmitted by radio from the microwave apparatus 5 via the antenna A2. Further, the microwave apparatus 4 demodulates the received microwave to a baseband signal, then extracts a clock (second clock) from a cycle of data (second data) included in this baseband signal, imports this baseband signal in synchronization with this clock, and plays back the data (second data). The radio equipment control 2 receives the data played back by the microwave apparatus 4, outputs the data to a higher level apparatus and executes various types of processing based on this data. In this regard, when the frequency fluctuation amount of the extracted clock exceeds the predetermined range, the microwave apparatus 4 outputs dummy data (second dummy data) instead of the played back data. In this regard, the dummy data is data which satisfies synchronization accuracy. Thus, even when the frequency fluctuation amount of the clock becomes large, the base station apparatus 1 can satisfy the radio standards (CPRI standards) between the radio equipment 3 and the user terminal 6, and maintain the link between the radio equipment control 2 and the user terminal 6. Consequently, it is possible to quickly resume communication when, for example, the frequency fluctuation amount of the clock becomes small.

Second Embodiment

Specific configurations and operations of microwave apparatuses 4 and 5 will be described in the present embodiment.

(Specific Configuration of Microwave Apparatus 4)

Figure 2:
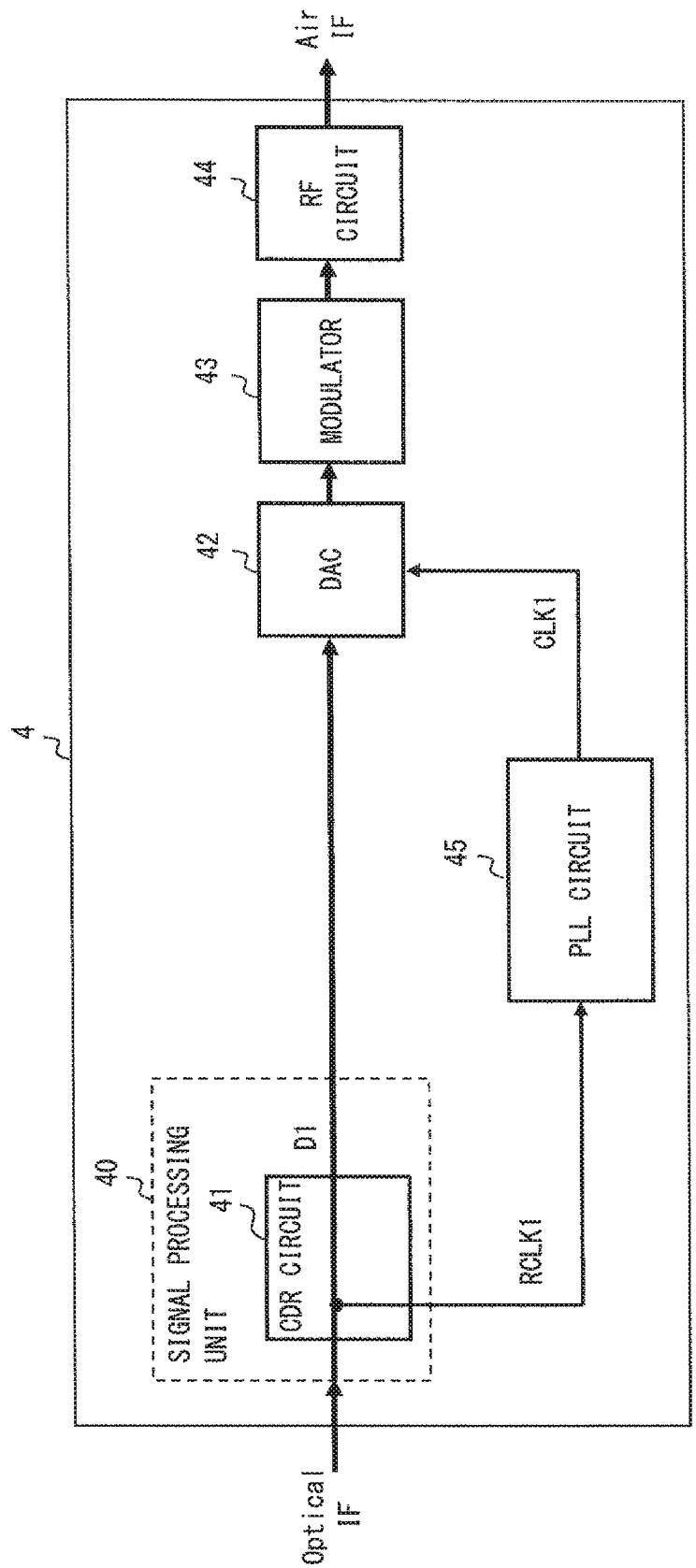
FIG. 2 is a block diagram illustrating a specific configuration of a microwave apparatus provided to a side of a radio equipment control of the base station apparatus illustrated in FIG. 1.

FIG. 2 is a block diagram illustrating the specific configuration of the microwave apparatus 4 at a side of a radio equipment control 2.

As illustrated in FIG. 2, the microwave apparatus 4 includes a signal processing unit 40, a DA converter (DAC) 42, a modulator 43, a RF circuit 44 and a PLL circuit 45. The signal processing unit 40 includes at least a CDR (Clock Data Recovery) circuit 41.

The signal processing unit 40 is a unit that performs signal processing on a baseband signal (an optical signal according to serial CPRI standards) from the radio equipment control 2, and outputs a digital parallel signal having a bandwidth for transmitting the baseband signal by radio. In this regard, the CDR circuit 41 provided to the signal processing unit 40 extracts data D1 and a reference clock RCLK1 from the baseband signal from the radio equipment control 2. For example, the CDR circuit 41 extracts the reference clock RCLK1 from a cycle of the data D1 included in the baseband signal from the radio equipment control 2.

The PLL circuit 45 is a circuit which outputs a clock CLK1 having the same phase as that of the reference clock RCLK1.

The PLL circuit 45 is a circuit which generates the clock CLK1 synchronized with the reference clock RCLK1 outputted from the CDR circuit 41. For example, the PLL circuit 45 includes a phase comparator which compares phases of the reference clock RCLK1 and a feedback clock FCLK1, a lowpass filter which generates a control voltage matching a comparison result of the phase comparator, and a voltage control oscillator which outputs an oscillation signal of a frequency matching the control voltage outputted from the lowpass filter. The oscillation signal outputted from the voltage control oscillator is used as the feedback clock FCLK1, and is outputted as the clock CLK1 to an outside of the PLL circuit 45.

The DA converter 42 imports the digital data D1 in synchronization with the clock CLK1 and converts the digital data D1 into an analog signal. The modulator 43 modulates the analog baseband signal outputted from the DA converter 42, and outputs an intermediate signal. Further, the RF circuit 44 mixes the intermediate signal outputted from the modulator 43 and a local signal outputted from a local oscillator (not illustrated), and outputs a microwave.

Furthermore, the microwave outputted from the RF circuit 44 is transmitted by radio to an outside via an antenna A1. In this regard, the microwave outputted from the RF circuit 44 may be amplified by a high output amplifier which is not illustrated, unnecessary components of the microwave may be removed by a bandpass filter which is not illustrated, and then the microwave may be transmitted by radio to the outside via the antenna A1.

(Specific Configuration of Microwave Apparatus 5)

Figure 3:
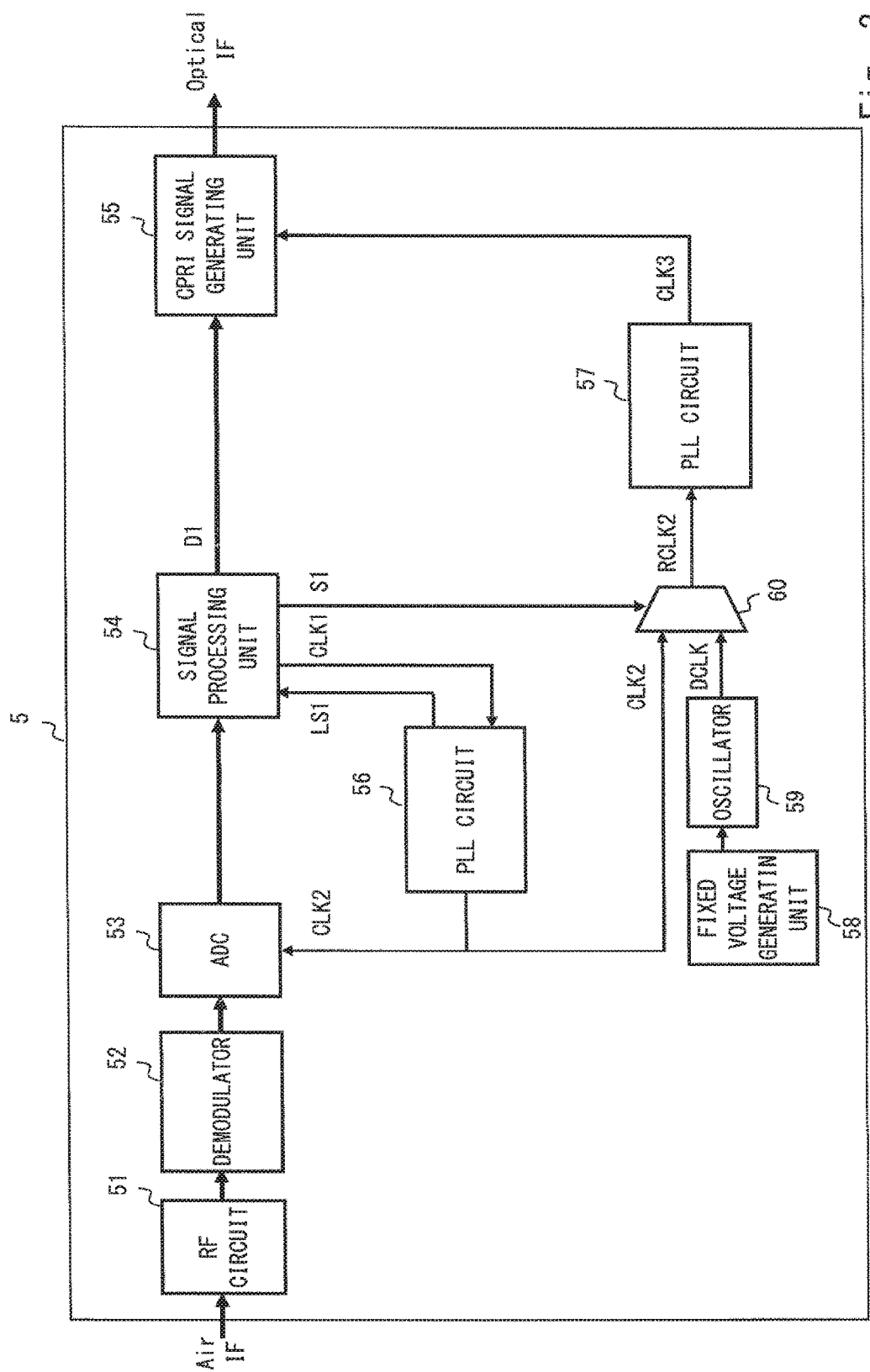
FIG. 3 is a block diagram illustrating a specific configuration of the microwave apparatus provided to a side of a radio equipment of the base station apparatus illustrated in FIG. 1.

FIG. 3 is a block diagram illustrating the specific configuration of the microwave apparatus 5 at a side of a radio equipment 3.

As illustrated in FIG. 3, the microwave apparatus 5 includes a RF circuit 51, a demodulator 52, an AD converter (ADC) 53, a signal processing unit 54, a CPRI signal generating unit (output data generating unit) 55, a PLL circuit (first PLL circuit) 56, a PLL circuit (second PLL circuit) 57, a fixed voltage generating unit 58, an oscillator 59 and a selection circuit 60.

The RF circuit 51 receives via an antenna A2 a microwave transmitted by radio from the microwave apparatus 4 via the antenna A1. Further, the RF circuit 51 mixes the received microwave and the local signal outputted from the local oscillator (not illustrated) and outputs an intermediate signal. The demodulator 52 demodulates the intermediate signal outputted from the RF circuit 51, and outputs a baseband signal. The AD converter 53 converts the analog baseband signal in synchronization with a clock CLK2 outputted from the PLL circuit 56 described below, into a digital signal.

The signal processing unit 54 plays back the data D1 and extracts the clock CLK1 from the digital baseband signal outputted from the AD converter 53. For example, the signal processing unit 54 extracts the clock CLK1 from a cycle of the baseband signal outputted from the AD converter 53.

Further, the signal processing unit 54 also has a function of determining whether or not a frequency fluctuation amount of the clock CLK1 is in a predetermined range. For example, the signal processing unit 54 outputs a determination result S1 of an L level when the frequency fluctuation amount of the clock CLK1 is in the predetermined range. Further, the signal processing unit 54 outputs the determination result S1 of an H level when the frequency fluctuation amount of the clock CLK1 exceeds the predetermined range due to a radio abnormality or an abnormality of a transmission side apparatus (the radio equipment control 2 or the microwave apparatus 4).

In this regard, the signal processing unit 54 may directly detect the frequency fluctuation amount of the clock CLK1 from the received baseband signal or may indirectly detect the frequency fluctuation amount of the clock CLK1 by detecting a CN (Carrier-to-Noise) ratio (a signal-to-noise ratio) of the received baseband signal. When the CN ratio deteriorates and becomes a predetermined value or less, it is highly probable that a phenomenon that a jitter deteriorates occurs, and the PLL circuit 56 is unlocked.

Further, the predetermined range can be arbitrarily set. For example, the predetermined range is determined based on a demanded specification of the base station apparatus.

The PLL circuit 56 is a circuit which generates the clock CLK2 having the same phase as that of the clock CLK1 by using the clock CLK1 extracted by the signal processing unit 54 as a reference clock. The PLL circuit 56 may output a state signal LS1 indicating a whether or not the PLL circuit 56 is in a locked state.

In this regard, the PLL circuit 56 widens a loop bandwidth to make it possible to maintain the locked state even when a clock frequency at the side of the radio equipment control 2 fluctuates.

The oscillator 59 outputs an oscillation signal of a fixed frequency as a dummy clock (first dummy clock) DCLK based on a fixed voltage generated by the fixed voltage generating unit 58.

The selection circuit 60 selects and outputs one of the clock CLK2 (also referred to as a normal clock) and the dummy clock DCLK based on the determination result S1 generated by the signal processing unit 54. For example, the selection circuit 60 selects and outputs the clock CLK2 when the determination result S1 indicates the L level (when the frequency fluctuation amount of the clock CLK1 is in the predetermined range), and selects and outputs the dummy clock DCLK when the determination result S1 indicates the H level (when the frequency fluctuation amount of the clock CLK1 exceeds the predetermined range). The clock selected and outputted by the selection circuit 60 is inputted as a reference clock RCLK2 to the PLL circuit 57.

The PLL circuit 57 outputs a clock CLK3 having the same phase as that of the reference clock RCLK2 outputted from the selection circuit 60. More specifically, when the frequency fluctuation amount of the clock CLK1 is in the predetermined range, the selection circuit 60 selects and outputs the clock CLK2, and therefore the PLL circuit 57 outputs the clock CLK3 having the same phase as that of the clock CLK2, and, when the frequency fluctuation amount of the clock CLK1 exceeds the predetermined range, the selection circuit 60 selects and outputs the dummy clock DCLK, and therefore the PLL circuit 57 outputs the clock CLK3 having the same phase as that of the dummy clock DCLK.

For example, the PLL circuit 57 includes a phase comparator which compares phases of the reference clock RCLK2 outputted from the selection circuit 60 and a feedback clock FCLK3, a lowpass filter which outputs a control voltage matching a comparison result of the phase comparator, and a voltage control oscillator which outputs an oscillation signal of a frequency matching the control voltage outputted from the lowpass filter. The oscillation signal outputted from the voltage control oscillator is used as the feedback clock FCLK3, and is outputted as the clock CLK3 to the outside of the PLL circuit 57.

In this regard, the PLL circuit 57 narrows a loop bandwidth compared to the loop bandwidth of at least the PLL circuit 56 to satisfy synchronization accuracy according to the CPRI standards.

The CPRI signal generating unit 55 generates data Dout satisfying the synchronization accuracy according to the CPRI standards by performing synchronization processing (importing and outputting in synchronization with the clock CLK3) on the data D1 played back by the signal processing unit 54 by using the clock CLK3.

(First Wireless Communication Method Between Radio Equipment Control 2 and Radio Equipment 3)

Figure 4:
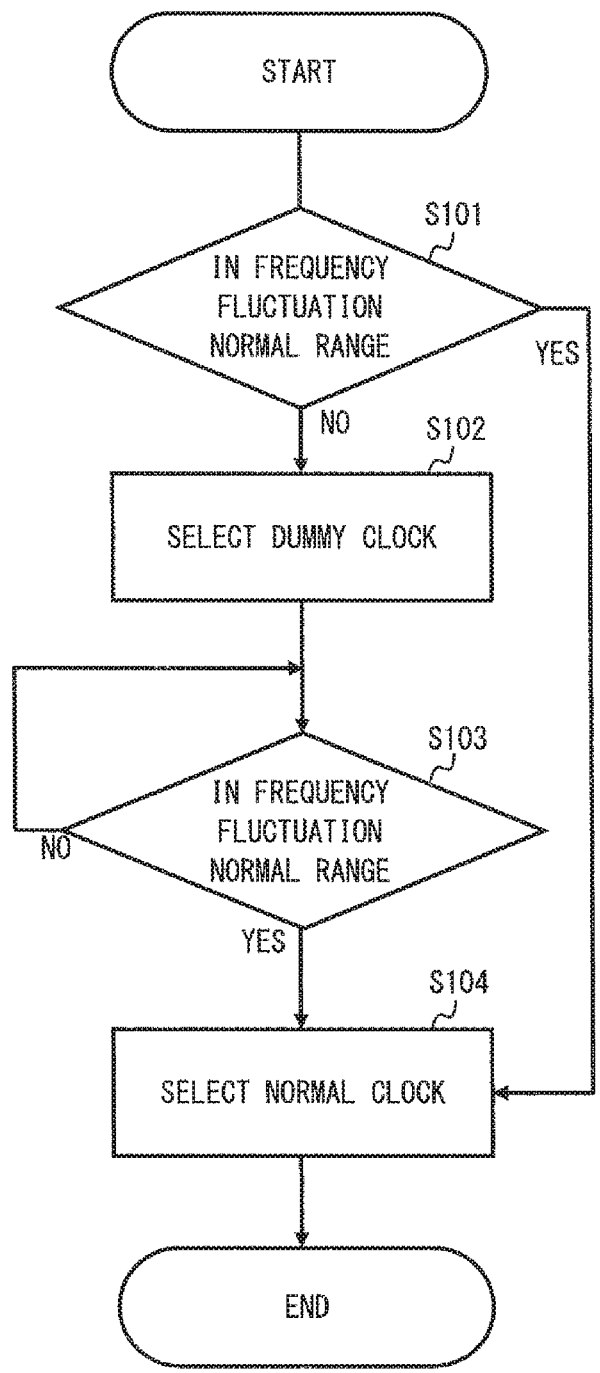
FIG. 4 is a flowchart illustrating a first wireless communication method between a radio equipment control 2 and a radio equipment 3 which compose a base station apparatus 1 illustrated in FIG. 1.

Next, a first wireless communication method between the radio equipment control 2 and the radio equipment 3 will be described. FIG. 4 is a flowchart illustrating the first wireless communication method between the radio equipment control 2 and the radio equipment 3 which compose the base station apparatus 1.

As illustrated in FIG. 4, the microwave apparatus 5 determines whether or not the frequency fluctuation amount of the clock CLK1 is in a normal range (predetermined range) during a normal operation (step S101).

For example, when the frequency fluctuation amount of the clock CLK1 is in the normal range (YES in step S101), the microwave apparatus 5 maintains selection of the normal clock CLK2 (step S104) and continues the normal operation.

On the other hand, when the frequency fluctuation amount of the clock CLK1 exceeds the normal range due to a radio abnormality or an abnormality of a transmission side apparatus (the radio equipment control 2 or the microwave apparatus 4) (NO in step S101), the microwave apparatus 5 selects the dummy clock DCLK (step S102) and temporarily stops the normal operation. In this case, the microwave apparatus 5 performs synchronization processing on the data D1 by using the clock CLK3 generated based on the dummy clock DCLK. Thus, the microwave apparatus 5 outputs the dummy data Dout which satisfies the synchronization accuracy according to the CPRI standards while the normal operation stops, too.

Subsequently, the microwave apparatus 5 maintains the selection of the dummy clock DCLK while the frequency fluctuation amount of the clock CLK1 exceeds the normal range (NO in step S103), and switches the selection from the dummy clock DCLK to the normal clock CLK2 (step S104) when the frequency fluctuation amount of the clock CLK1 is in the normal range (YES in step S103), and resumes the normal operation.

Thus, while the base station apparatus 1 temporarily stops communication even when the frequency fluctuation amount of the clock increases due to an influence of a radio abnormality or an abnormality of the transmission side apparatus, the base station apparatus 1 can satisfy the radio standards (CPRI standards) between the radio equipment 3 and the user terminal 6 and maintain a link between the radio equipment control 2 and the user terminal 6. Consequently, when, for example, the frequency fluctuation amount of the clock becomes small, it is possible to quickly resume communication.

A case where the signal processing unit 54 determines whether or not the frequency fluctuation amount of the clock CLK1 is in the predetermined range has been described as an example in the present embodiment. However, the present invention is not limited to this. When receiving a notification for switching the frequency of the clock CLK1 from the radio equipment control 2 or receiving a notification for switching radio transmission of a microwave from the microwave apparatus 4 to another microwave apparatus (third microwave apparatus) provided in parallel to the microwave apparatus 4, the signal processing unit 54 may determine that the frequency fluctuation amount of the clock CLK1 exceeds the predetermined range, and output the determination result S1 of the H level before the frequency fluctuation amount of the clock CLK1 exceeds the predetermined range. This will more specifically described with reference to FIG. 5.

(Wireless Communication Method Between Radio Equipment Control 2 and Radio Equipment 3)

Figure 5:
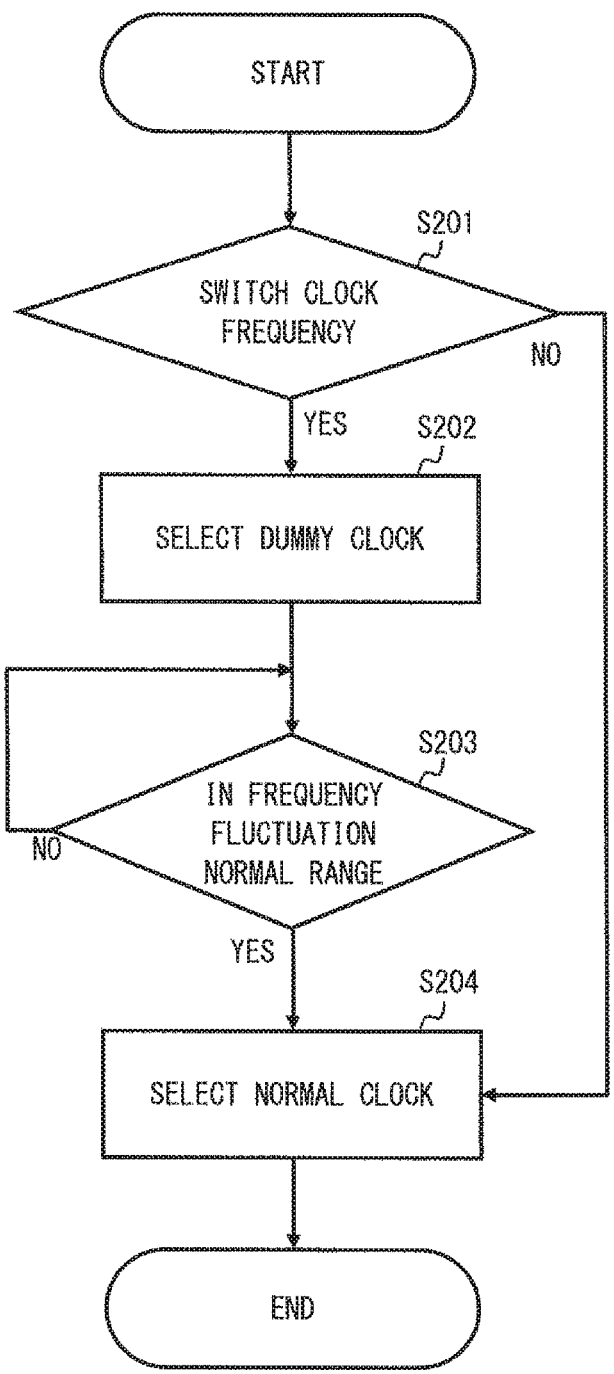
FIG. 5 is a flowchart illustrating a second wireless communication method between the radio equipment control 2 and the radio equipment 3 which compose the base station apparatus 1 illustrated in FIG. 1.

FIG. 5 is a flowchart illustrating a second wireless communication method between the radio equipment control 2 and the radio equipment 3 which compose the base station apparatus 1.

As illustrated in FIG. 5, when receiving no notification from the radio equipment control 2 during the normal operation (NO in step S201), the microwave apparatus 5 maintains selection of the normal clock CLK2 (step S204) and continues the normal operation.

On the other hand, when receiving a notification for switching the frequency of the clock CLK1 from the radio equipment control 2 or when receiving a notification for switching radio transmission of a microwave from the microwave apparatus 4 to another microwave apparatus (YES in step S201), the microwave apparatus 5 selects the dummy clock DCLK (step S202) and temporarily stops the normal operation. In this case, the microwave apparatus 5 performs synchronization processing on the data D1 by using the clock CLK3 generated based on the dummy clock DCLK. By this means, the microwave apparatus 5 outputs the dummy data Dout which satisfies the synchronization accuracy according to the CPRI standards while the normal operations stops, too.

Subsequently, the microwave apparatus 5 maintains selection of the dummy clock DCLK when the frequency fluctuation amount of the clock CLK1 exceeds the normal range (NO in step S203), and switches selection from the dummy clock DCLK to the normal clock CLK2 (step S204) when the frequency fluctuation amount of the clock CLK1 is in the normal range (YES in step S203), and resumes the normal operation.

Thus, while the base station apparatus 1 temporarily stops communication even when the frequency fluctuation amount of the clock is intentionally increased, the base station apparatus 1 can satisfy the radio standards (CPRI standards) between the radio equipment 3 and the user terminal 6 and maintain the link between the radio equipment control 2 and the user terminal 6. Consequently, when, for example, the frequency fluctuation amount of the clock becomes small, it is possible to quickly resume communication.

(Difference from Related Art)

Patent Literature 2 discloses only switching between a regular synchronization clock and a dummy clock, and neither discloses nor suggests switching a regular synchronization clock and a dummy clock based on whether or not the frequency fluctuation amount of the clock used during the normal operation is in the predetermined range. By contrast with this, the base station apparatus according to the present invention switches between a regular synchronization clock and a dummy clock based on whether or not the frequency fluctuation amount of the clock used during the normal operation is in the predetermined range.

The present invention has been described above with reference to the embodiments. However, the present invention is not limited to the above. The configurations and the details of the present invention can be variously changed within the scope of the invention as long as one of ordinary skill in the art can understand the changes.

This application claims priority to Japanese Patent Application No. 2014-257495 filed on Dec. 19, 2014, the entire contents of which are incorporated by reference herein.

REFERENCE SIGNS LIST

1 BASE STATION APPARATUS
2 RADIO EQUIPMENT CONTROL
3 RADIO EQUIPMENT
4 MICROWAVE APPARATUS
5 MICROWAVE APPARATUS
6 USER TERMINAL
40 SIGNAL PROCESSING UNIT
41 CDR CIRCUIT
42 DA CONVERTER
43 MODULATOR
44 RF CIRCUIT
45 PLL CIRCUIT
51 RF CIRCUIT
52 DEMODULATOR
53 AD CONVERTER
54 SIGNAL PROCESSING UNIT
55 CPRI SIGNAL GENERATING UNIT
56 PLL CIRCUIT
57 PLL CIRCUIT
58 FIXED VOLTAGE GENERATING UNIT
59 OSCILLATOR
60 SELECTION CIRCUIT
A1 to A3 ANTENNA

The invention claimed is:

1. A base station apparatus comprising:
a radio equipment control that generates a first baseband signal including first data;
a first microwave apparatus that modulates the first baseband signal to a first microwave and transmits the first microwave by radio;
a second microwave apparatus that demodulates the received first microwave to the first baseband signal, then extracts a first clock from a cycle of the first data included in the first baseband signal, imports the first baseband signal in synchronization with the first clock, and plays back the first data; and
a radio equipment that modulates the first data played back by the second microwave apparatus to a first high-frequency signal,
wherein the second microwave apparatus outputs first dummy data instead of the played back first data when a frequency fluctuation amount of the first clock exceeds a predetermined range.

2. The base station apparatus according to claim 1, wherein interfaces between the radio equipment control and the first microwave apparatus and between the second microwave apparatus and the radio equipment employ CPRI (Common Public Radio Interface) standards.

3. The base station apparatus according to claim 1, wherein the second microwave apparatus includes:
a demodulator that demodulates the first microwave received from the first microwave apparatus to the first baseband signal;

an AD converter that AD-converts the first baseband signal in synchronization with a second clock;

a signal processing circuit configured to extract the first clock and play back the first data from an output of the AD converter;

a first PLL circuit that generates the second clock by using the first clock as a reference clock;

a selection circuit that selects and outputs one of the second clock and a first dummy clock based on whether or not the frequency fluctuation amount of the first clock is within a predetermined range;

a second PLL circuit that generates a third clock by using the clock selected by the selection circuit as the reference clock, and has a narrower loop bandwidth than a loop bandwidth of the first PLL circuit; and an output data generating circuit configured to perform synchronization processing on the played back first data by using the third clock.

4. The base station apparatus according to claim 3, wherein the selection circuit selects and outputs the second clock when the frequency fluctuation amount of the first clock is within the predetermined range, and selects and outputs the first dummy clock when the frequency fluctuation amount of the first clock exceeds the predetermined range.

5. The base station apparatus according to claim 3, wherein the selection circuit selects and outputs the second clock when a CN (Carrier-to-Noise) ratio of the output of the AD converter exceeds a predetermined value, and selects and outputs the first dummy clock when the CN noise ratio of the output of the AD converter is the predetermined value or less.

6. The base station apparatus according to claim 3, wherein the selection circuit selects and outputs the first dummy clock when it receives from the radio equipment control a notification for switching a frequency of the first clock.

7. The base station apparatus according to claim 3, further comprising a third microwave apparatus that is provided in parallel to the first microwave apparatus,
wherein the selection circuit selects and outputs the first dummy clock when it receives a notification for switching the radio transmission of the first microwave from the first microwave apparatus to the third microwave apparatus.

8. The base station apparatus according to claim 3, wherein the selection circuit switches selection from the first dummy clock to the second clock and outputs the second clock when the frequency fluctuation amount of the first clock is within the predetermined range.

9. The base station apparatus according to claim 1, wherein
the radio equipment further demodulates a received second high-frequency signal to a second baseband signal,
the second microwave apparatus further modulates the second baseband signal demodulated by the radio equipment to a second microwave and transmits the second microwave by radio,
the first microwave apparatus further demodulates the received second microwave to the second baseband signal, then extracts a second clock from a cycle of second data included in the second baseband signal, imports the second baseband signal in synchronization with the second clock, and plays back the second data,
the radio equipment control further receives the second data played back by the first microwave apparatus, and
the first microwave apparatus outputs second dummy data instead of the played back second data when a frequency fluctuation amount of the second clock exceeds the predetermined range.

10. A base station apparatus comprising:
a radio equipment control:
a radio equipment; and
a serial data interface channel that is provided between the radio equipment control and the radio equipment,
wherein the serial data interface channel includes a radio transmission interval,
the radio equipment control and the radio equipment transmit and receive information including at least a data signal and a clock signal via the serial data interface, and
at least one of the radio equipment control and the radio equipment includes a circuit configured to control and determine whether or not it is possible to execute synchronization processing on the data signal accompanying playback of the clock signal according to a signal quality of the radio transmission interval.

11. The base station apparatus according to claim 10, wherein both the radio equipment control and the radio equipment include flail a circuit configured to control and determine whether or not it is possible to execute the synchronization processing on the data signal accompanying the playback of the clock signal according to the signal quality of the radio transmission interval.

12. A method for controlling a base station apparatus, the method comprising:
generating a first baseband signal including first data;
modulating the first baseband signal to a first microwave and transmitting the first microwave by radio from a first microwave apparatus;
demodulating the first microwave received by a second microwave apparatus to the first baseband signal, and then extracting a first clock from a cycle of the first data included in the first baseband signal;
importing the first baseband signal in synchronization with the first clock and playing back the first data when a frequency fluctuation amount of the first clock is within a predetermined range;
modulating the played back first data to a first high-frequency signal; and
generating first dummy data instead of the first data when the frequency fluctuation amount of the first clock exceeds the predetermined range.

13. The base station apparatus according to claim 10, the serial data interface is a CPRI (Common Public Radio Interface).

* * * * *

UNITED STATES PATENT AND TRADEMARK OFFICE
CERTIFICATE OF CORRECTION

PATENT NO. : 10,250,378 B2
APPLICATION NO. : 15/536992
DATED : April 2, 2019
INVENTOR(S) : Hiroto Iizuka Page 1 of 1

It is certified that error appears in the above-identified patent and that said Letters Patent is hereby corrected as shown below:

In the Drawings

Sheet 3 of 5, Reference Numeral 58, Fig. 3, Line 3; Delete "GENERATIN" and insert --GENERATING-- therefor In the Claims Column 12, Line 31; In Claim 11, after "include", delete "flail"

Signed and Sealed this
Thirtieth Day of July, 2019

Andrei Iancu
*Director of the United States Patent and Trademark Office*